(12) United States Patent
Wang

(10) Patent No.: US 11,541,746 B2
(45) Date of Patent: Jan. 3, 2023

(54) OILING OR CHARGING PORT ASSEMBLY

(71) Applicant: ILLINOIS TOOL WORKS INC., Glenview, IL (US)

(72) Inventor: Tao Wang, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 567 days.

(21) Appl. No.: 16/537,114

(22) Filed: Aug. 9, 2019

(65) Prior Publication Data

US 2020/0062111 A1 Feb. 27, 2020

(30) Foreign Application Priority Data

Aug. 24, 2018 (CN) .......................... 201810974246.7
Aug. 24, 2018 (CN) .......................... 201821379111.8

(51) Int. Cl.
*B60K 15/035* (2006.01)
*B60K 15/04* (2006.01)

(52) U.S. Cl.
CPC ........ *B60K 15/03504* (2013.01); *B60K 15/04* (2013.01); *B60K 2015/048* (2013.01); *B60K 2015/0467* (2013.01)

(58) Field of Classification Search
CPC .............. B60K 15/03504; B60K 15/04; B60K 2015/0467; B60K 215/048
USPC ....................................................... 220/86.2
See application file for complete search history.

(56) References Cited

U.S. PATENT DOCUMENTS

| 2008/0136210 A1* | 6/2008 | Scott ...................... B60K 15/04 296/97.22 |
| 2009/0095373 A1* | 4/2009 | Correira ................. B60K 15/04 141/350 |
| 2014/0084550 A1* | 3/2014 | Ogata ...................... F16J 15/02 277/626 |
| 2015/0274010 A1* | 10/2015 | Roth ...................... F16J 15/025 220/86.2 |
| 2016/0325621 A1* | 11/2016 | Le-Tinnier ............. B60K 15/04 |
| 2018/0145442 A1* | 5/2018 | Sanchez Patino .. B29C 45/1671 |
| 2018/0264938 A1* | 9/2018 | Kohlmann ............. B60K 15/05 |
| 2019/0248232 A1* | 8/2019 | Stack ..................... B60K 15/05 |
| 2020/0047609 A1* | 2/2020 | Kober ................ B60K 15/0406 |

FOREIGN PATENT DOCUMENTS

| CN | 104343788 A | 2/2015 |
| CN | 107399232 A | 11/2017 |
| CN | 209904886 U | 1/2020 |
| DE | 19514753 A1 | 11/1995 |
| FR | 2821800 A1 | 9/2002 |
| JP | 2013123930 A | 6/2013 |

* cited by examiner

*Primary Examiner* — J. Gregory Pickett
*Assistant Examiner* — Niki M Eloshway
(74) *Attorney, Agent, or Firm* — Quarles & Brady LLP

(57) ABSTRACT

The present disclosure relates to an energy replenishment port assembly, comprising: a housing seal made of an elastic material; a housing having an installation port, the housing seal being arranged around an edge of the installation port and extending from a reverse side of the edge of the installation port; and a receiving port component comprising a receiving port, the receiving port component being detachably installed on the installation port. The housing seal is configured to being pressed against a vehicle body to sealingly install the housing onto the vehicle body. The receiving port is configured to receive an energy replenishment connector.

20 Claims, 12 Drawing Sheets

A-A

OILING OR CHARGING PORT ASSEMBLY

RELATED APPLICATIONS

This application claims the benefit of Chinese Patent Application No. 201810974246.7, filed Aug. 24, 2018, and Chinese Patent Application No. 201821379111.8, filed Aug. 24, 2018, which are hereby incorporated by reference in their entirety.

TECHNICAL FIELD

The present disclosure relates to an energy replenishment port assembly for a motor vehicle, and in particular to an energy replenishment port assembly for a refueling pipe or a charging connection pipe installed on a vehicle body of a motor vehicle.

BACKGROUND

Refueling is a common operation associated with motor vehicles. During refueling, a refueling pipe is inserted into an opening defined in a vehicle body that is in communication with a fuel tank of the vehicle. In order to facilitate the operation, a corresponding energy replenishment port assembly is typically installed in the opening of the vehicle body to facilitate receiving the refueling pipe and directing the refueling pipe to align with an inlet of the fuel tank. The operation of filling the vehicle with fuel or another desired fluid (e.g. a urea solution) or charging the vehicle is simplified by installing the energy replenishment port assembly corresponding to a filling opening or charging jack on the vehicle body.

SUMMARY

An object of the present disclosure is to provide an energy replenishment port assembly that can be conveniently installed on a vehicle body while achieving good sealing between the energy replenishment port assembly and the inner metal plate of the vehicle body and between the energy replenishment port assembly and an energy replenishment connector.

The present disclosure provides an energy replenishment port assembly, comprising: a housing seal made of elastic material; a housing having an installation port, the housing seal being arranged around an edge of the installation port and extending from a reverse side of the edge of the installation port; and a receiving port component comprising at least one receiving port, the receiving port component being detachably installed on the installation port; wherein the housing seal is configured to be sealingly pressed against a vehicle body to install the housing onto the vehicle body; and wherein the at least one receiving port is configured to receive an energy replenishment connector.

According to the energy replenishment port assembly described above, the at least one receiving port comprises a pipeline seal, and the pipeline seal is configured to sealingly press against the energy replenishment connector.

According to the energy replenishment port assembly described above, the receiving port component further comprises a base plate extending outwardly from an edge of the at least one receiving port, wherein the receiving port component is configured to be installed on the installation port via the base plate.

According to the energy replenishment port assembly described above, the energy replenishment port assembly further comprises a receiving port component seal, and the receiving port component seal is sealingly arranged between the base plate and the housing to connecting the base plate to the housing.

According to the energy replenishment port assembly described above, the base plate is engaged with the housing.

According to the energy replenishment port assembly described above, the base plate further comprises at least one snap-fit fastener, the at least one snap-fit fastener being arranged on a reverse side of the base plate; and the housing further comprises at least one snap-fit fastener receiving part, the at least one snap-fit fastener receiving part being arranged at the edge of the installation port to receive the at least one snap-fit fastener.

According to the energy replenishment port assembly described above, a positioning assembly is provided on the base plate and the housing to position the base plate relative to the housing.

According to the energy replenishment port assembly described above, the positioning assembly comprises at least one positioning protrusion provided on the reverse side of the base plate and at least one positioning hole provided on the housing, the at least one positioning hole being configured to receive the at least one positioning protrusion.

According to the energy replenishment port assembly described above, the energy replenishment port assembly further comprises an upper cover, the upper cover being pivotably mounted on the housing such that the at least one receiving port is exposed when the upper cover is opened and the at least one receiving port is shielded when the upper cover is closed.

According to the energy replenishment port assembly described above, the receiving port component comprises two receiving ports.

The concept, specific structure and resulting technical effect of the present disclosure are further described below in conjunction with the drawings to fully understand the object, features and effects of the present disclosure.

BRIEF DESCRIPTION OF THE DRAWINGS

The present disclosure will become more easily understood when reading the following detailed description in conjunction with the accompanying drawings, throughout the drawings, like reference numbers represent like parts, in the drawings.

DETAILED DESCRIPTION

Various embodiments of the present disclosure are described below with reference to the accompanying drawings which constitute part of this description. It is to be understood that although the terms indicating orientations, such as "front", "rear", "upper", "lower", "left", "right", "inner", "outer" "top", "bottom", "obverse" and "reverse", are used in the present disclosure to describe structural parts and elements in various examples of the present disclosure, these terms are used herein only for ease of illustration and are determined based on the exemplary orientations as shown in the accompanying drawings. Since the embodiments disclosed in the present disclosure can be arranged in different directions, these terms indicating directions are only illustrative and should not be considered as limitations.

In the following description, unless otherwise specified, the side facing the outside of the vehicle body is the obverse side, and the side facing the inside of the vehicle body is the reverse side.

The energy replenishment port assembly of the present disclosure is introduced below by taking the energy replenishment port assembly for the refueling operation as an example, and it can be understood that the energy replenishment port assembly provided by the present disclosure can also be used for filling the vehicle with another fuel or fluid or used for charging the vehicle and the like.

Figure 1:
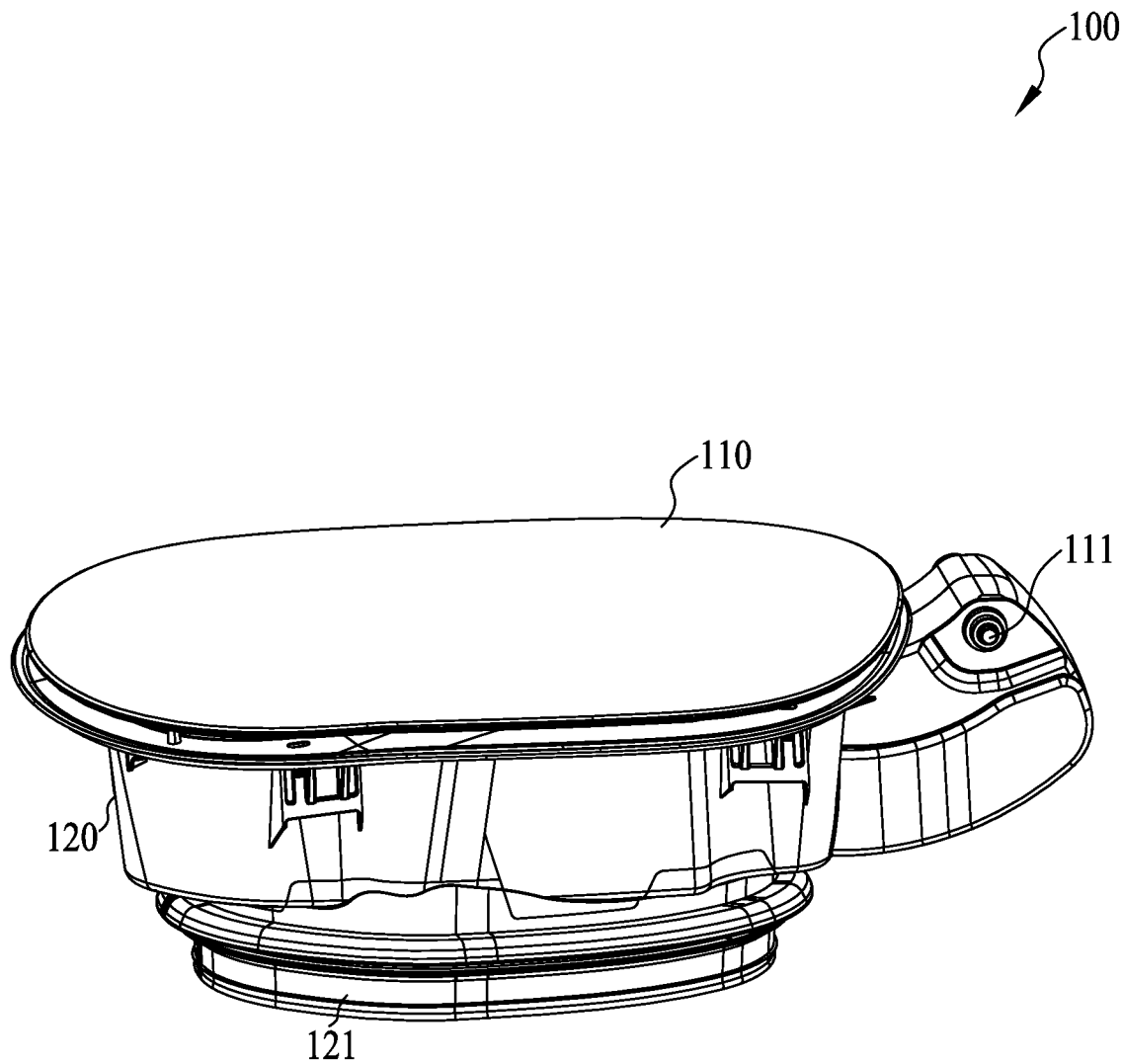
FIG. 1 is an isometric view of an energy replenishment port assembly of the present disclosure.

FIG. 1 is an isometric view of an energy replenishment port assembly 100 of the present disclosure. As shown in FIG. 1, the energy replenishment port assembly 100 comprises an upper cover 110 and a housing 120, and the upper cover 110 is pivotally mounted on the housing 120 via a shaft 111 to open or close the housing 120.

A housing seal 121 is provided on the housing 120, and the housing seal 121 extends from a reverse side of the housing 120. The reverse side of the housing 120 refers to the side where the energy replenishment port assembly 100 is hidden in the vehicle body after being installed in place on the vehicle body. The housing seal 121 is made of an elastic material, e.g., soft rubber, flexible plastic or the like. The housing 120 can be made of a relatively harder material, e.g., hard plastic or the like. The housing seal 121 may be integrally formed with the housing 120 by means of overmolding. When the energy replenishment port assembly 100 is being installed on the vehicle body, the housing seal 121 can be pressed against the edge of the opening of the inner metal plate of the vehicle body so as to sealingly install the housing 120 onto the vehicle body.

Figure 2A:
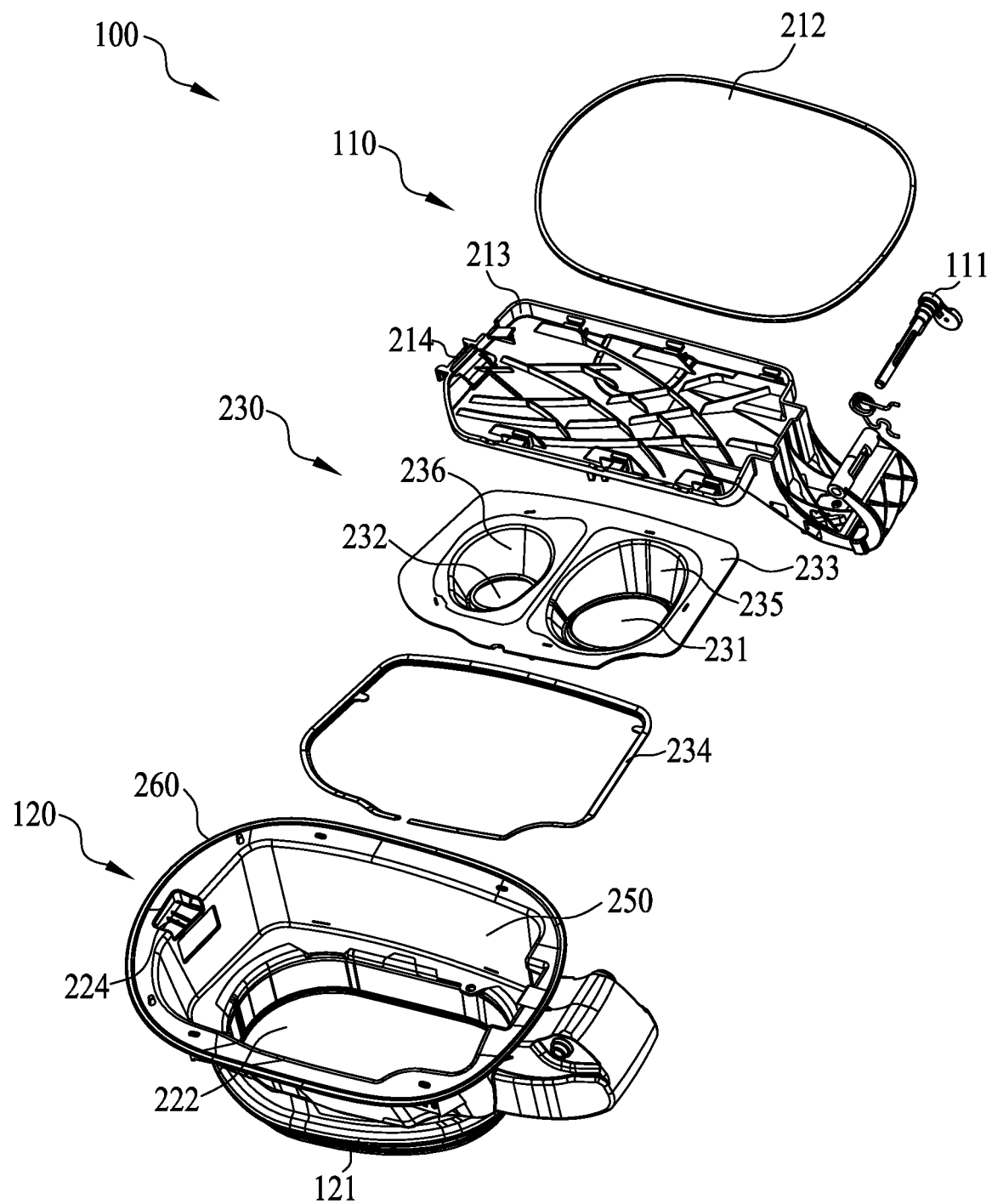
FIG. 2A is an exploded view of the energy replenishment port assembly of FIG. 1.
Figure 2B:
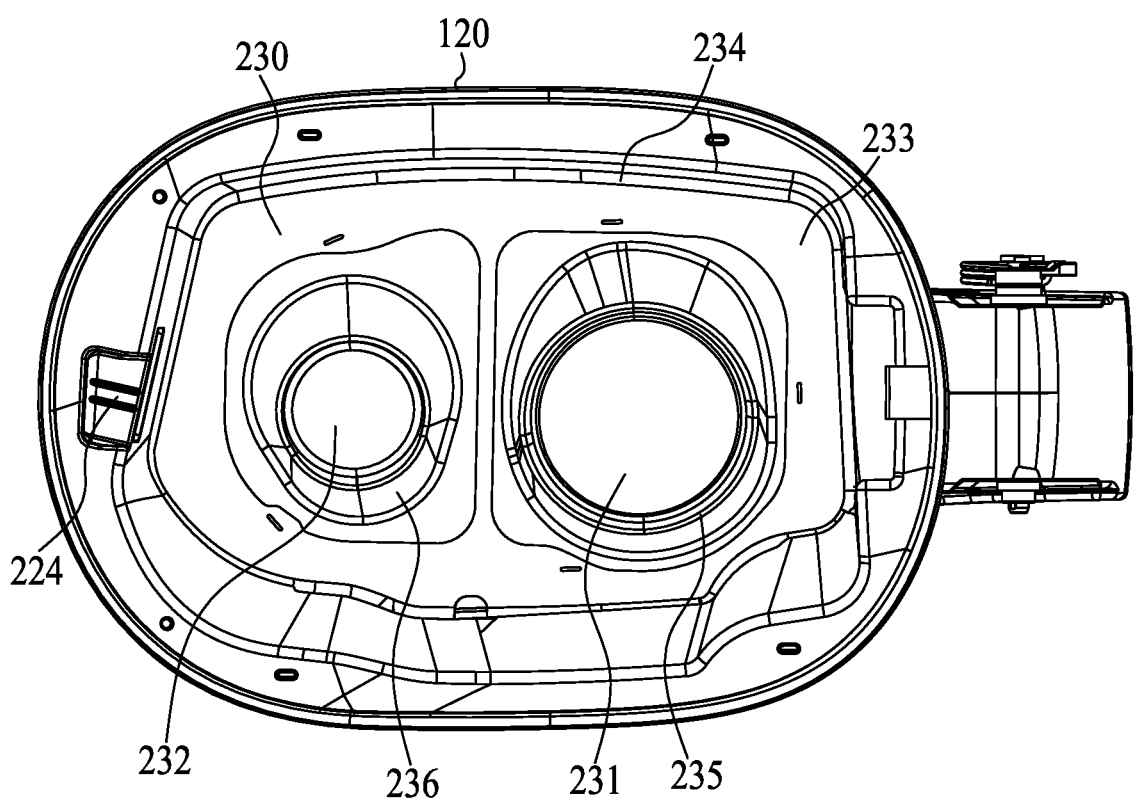
FIG. 2B is a top view of the energy replenishment port assembly of FIGS. 1 and 2A with an upper cover removed.

FIG. 2A is an exploded view of the energy replenishment port assembly 100 of FIG. 1. FIG. 2B is a top view of the energy replenishment port assembly 100 of FIGS. 1 and 2A with an upper cover 110 removed.

As shown in FIGS. 2A and 2B, in addition to the upper cover 110 and the housing 120, the energy replenishment port assembly 100 further comprises a receiving port component 230 and a receiving port component seal 234, and the receiving port component seal 234 is used for sealingly connecting the receiving port component 230 onto the housing 120.

The housing 120 is substantially cup-shaped and comprises a side wall 250, an inlet 260 at the top, and an installation port 222 at the bottom. The housing seal 121 is configured around an edge of the installation port 222 and extends from a reverse side of the edge of the installation port 222. The upper cover 110 is configured to open and close the inlet 260.

The receiving port component 230 comprises receiving ports 231, 232, and a base plate 233 formed by extending outwardly from edges of the receiving ports 231, 232. The receiving port component 230 can be detachably mounted on the installation port 222 of the housing 120 via the base plate 233. In some embodiments, one or more of the receiving port 231 and the receiving port 232 are used for receiving energy replenishment connectors (e.g., a refueling pipe or a charging connection pipe). In some embodiments, one or more of the receiving port 231 and the receiving port 232 are used for receiving other connectors, for example a pipeline for filling the vehicle with urea solution. Those skilled in the art should understand that in other embodiments, the receiving port component 230 may comprise only one receiving port, and may also include more receiving ports, which is not limited to the two receiving ports shown in FIGS. 2A and 2B.

The receiving port component 230 further comprises pipeline seals 235 and 236 provided on a reverse side of the base plate 233 and respectively around the edges of the receiving ports 231 and 232, and the pipeline seals 235 and 236 are used for pressing against the energy replenishment connector when the energy replenishment connector is being inserted into the receiving ports 231 and 232, respectively, so that the receiving ports 231 and 232 can sealingly receive the energy replenishment connector. The pipeline seals 235 and 236 extend inwards from edges of the receiving ports 231 and 232 by a certain distance and gradually shrink to form a truncated cone shape so that the pipeline seals 235 and 236 can be pressed more tightly against the energy replenishment connector.

The receiving port component seal 234 is arranged between the base plate 233 and the housing 120 for sealingly connecting the base plate 233 to the housing 120. In the embodiment as shown in FIGS. 2A and 2B, the receiving port component seal 234 and the base plate 233 are separate components. As a further embodiment, the receiving port component seal 234 may be integrally formed with the base plate 233, and the receiving port component seal 234 is arranged to cover the outer edge of the base plate 233.

As shown in FIG. 2A, the upper cover 110 comprises a cover plate 212 and a bottom plate 213, and the cover plate 212 is fixed to the bottom plate 213. One end of the bottom plate 213 is rotatably mounted on the housing 120 via the shaft 111. The other end of the bottom plate 213 is provided with a locking part 214, and a corresponding position on the side wall 250 at the inlet 260 of the housing 120 is provided with a locking receiving part 224 for receiving and locking the locking part 214. When the locking receiving part 224 receives and locks the locking part 214, the upper cover 110 is in a closed state and can shield the receiving ports 231, 232, and the surface of the cover plate 212 is flush with the outer surface of the outer metal plate of the vehicle body. When the locking receiving part 224 releases the locking part 214, the upper cover 110 can rotate outwardly around the shaft 111, so that the receiving ports 231, 232 can be exposed to receive the energy replenishment connector. The locking part 214 is, for example, a snap-fit fastener, and the locking receiving part 224 is, for example, a groove corresponding to the snap-fit fastener.

Figure 3A:
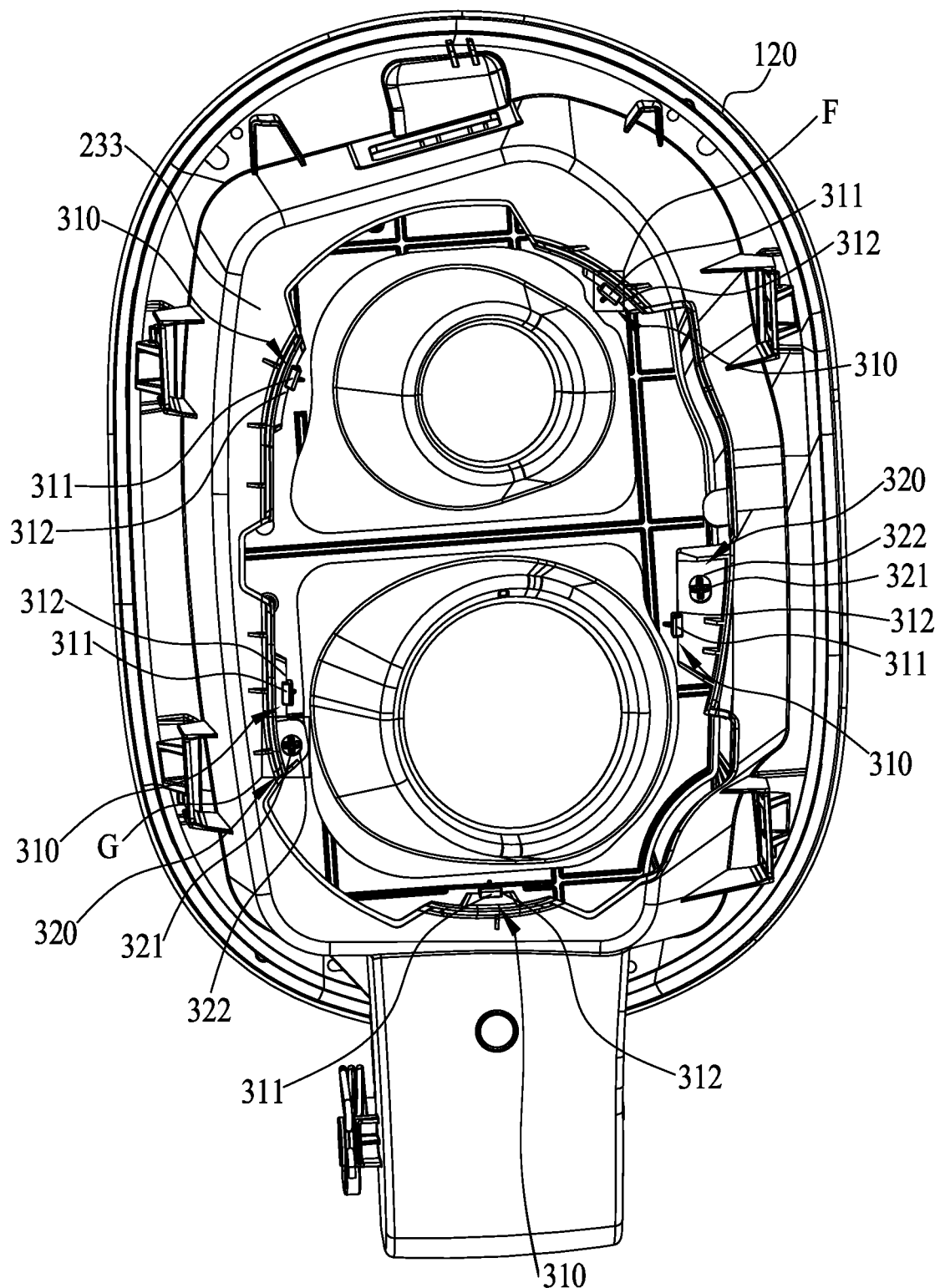
FIG. 3A is a rear view of the energy replenishment port assembly of FIGS. 1, 2A, and 2B with the upper cover removed as shown in FIG. 2B.
Figure 3B:
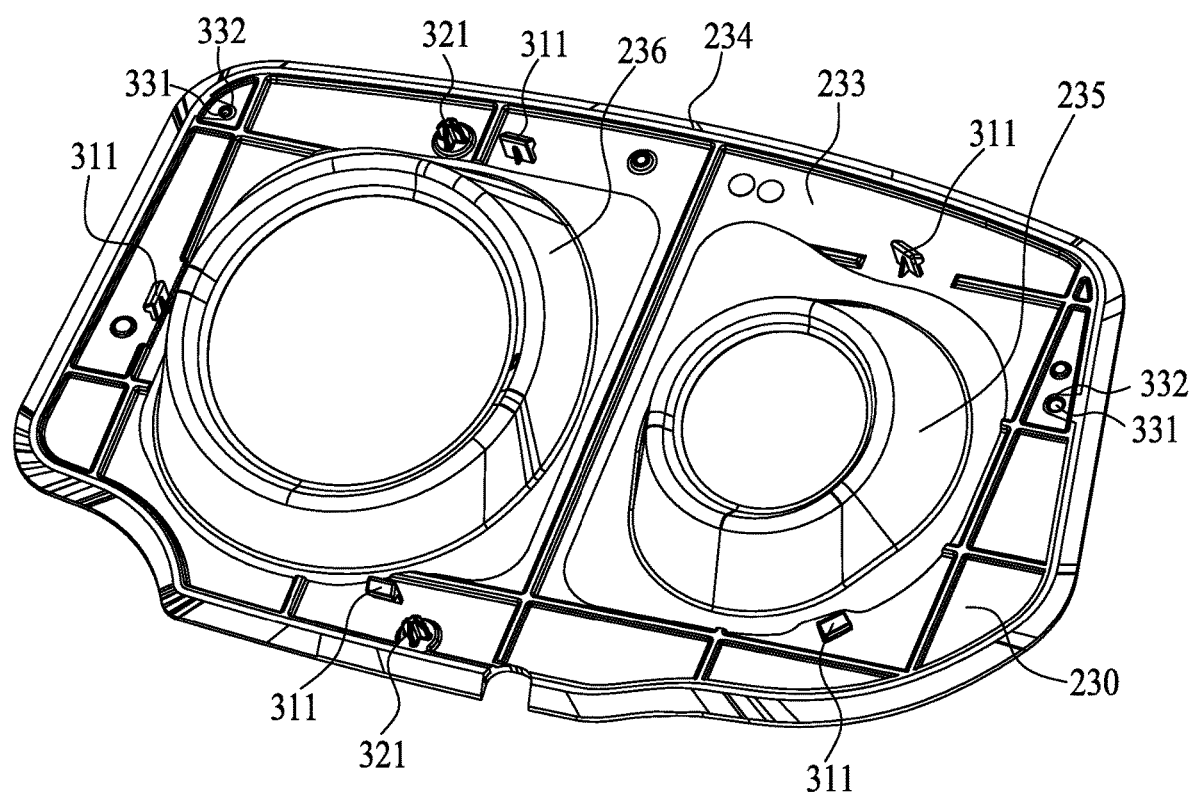
FIG. 3B is a rear view of a receiving port component and a receiving port component seal of the energy replenishment port assembly of FIGS. 1-3A.
Figure 3C:
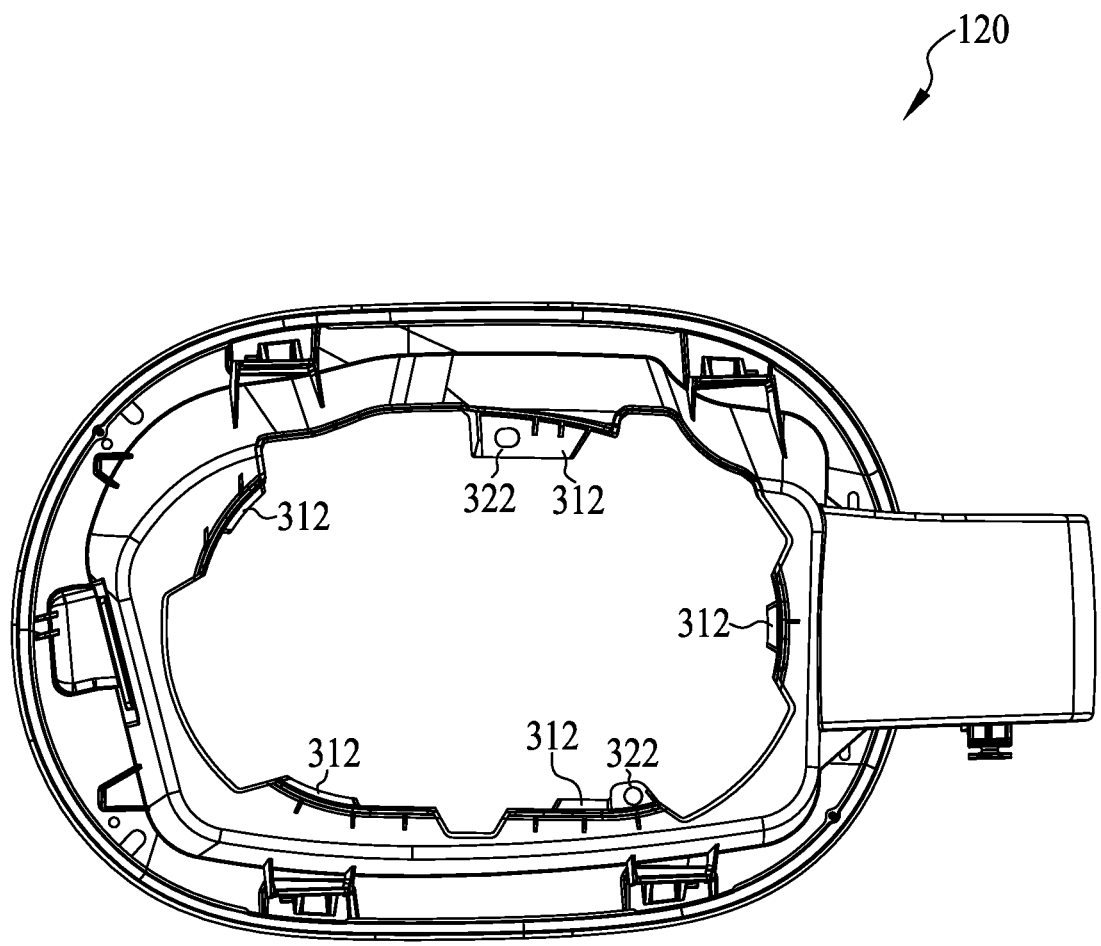
FIG. 3C is a rear view of a housing of the energy replenishment port assembly of FIGS. 1-3A.
Figure 3D:
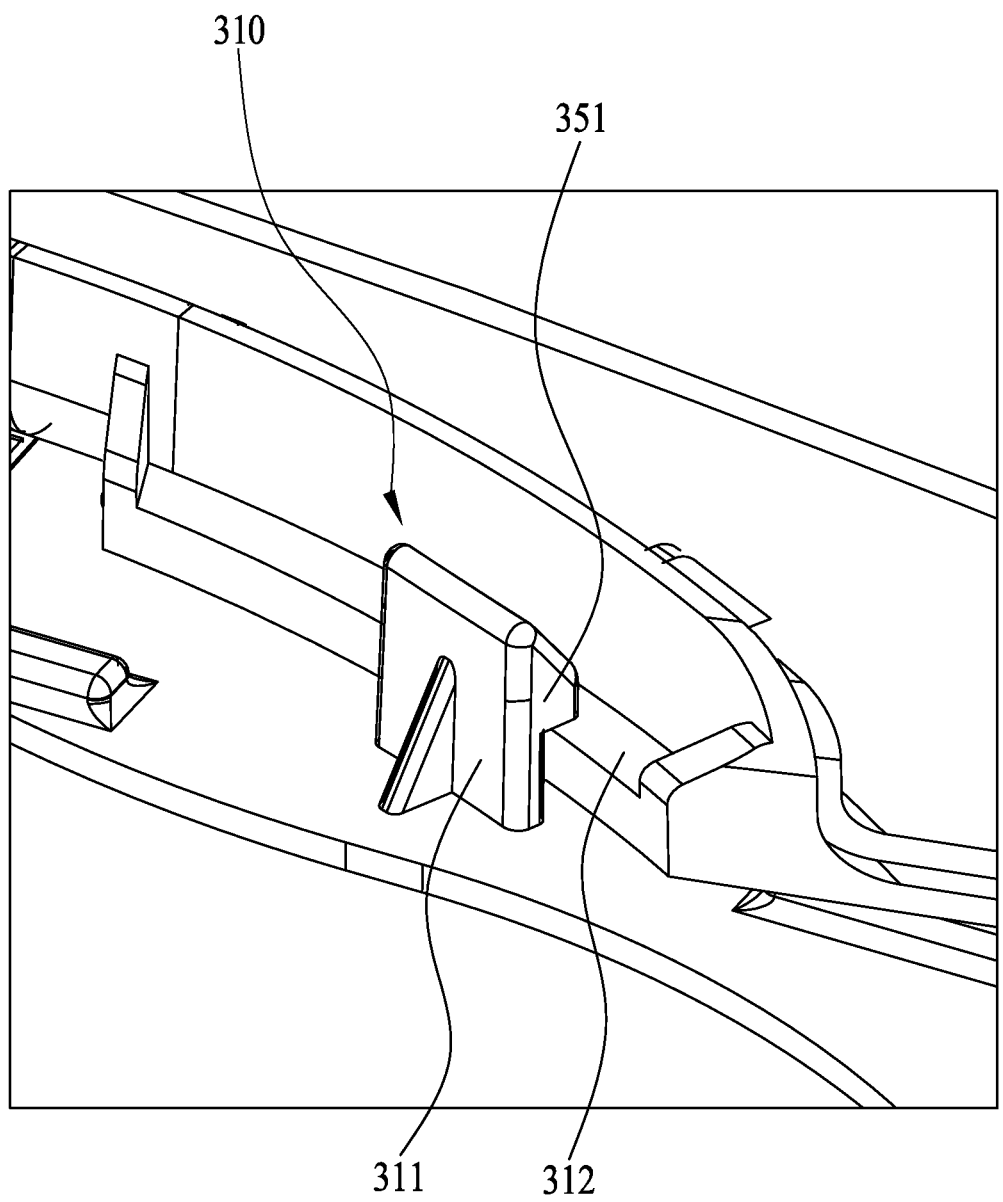
FIG. 3D is an enlarged view of the energy replenishment port assembly of FIGS. 1-3A taken from region F of FIG. 3A.
Figure 3E:
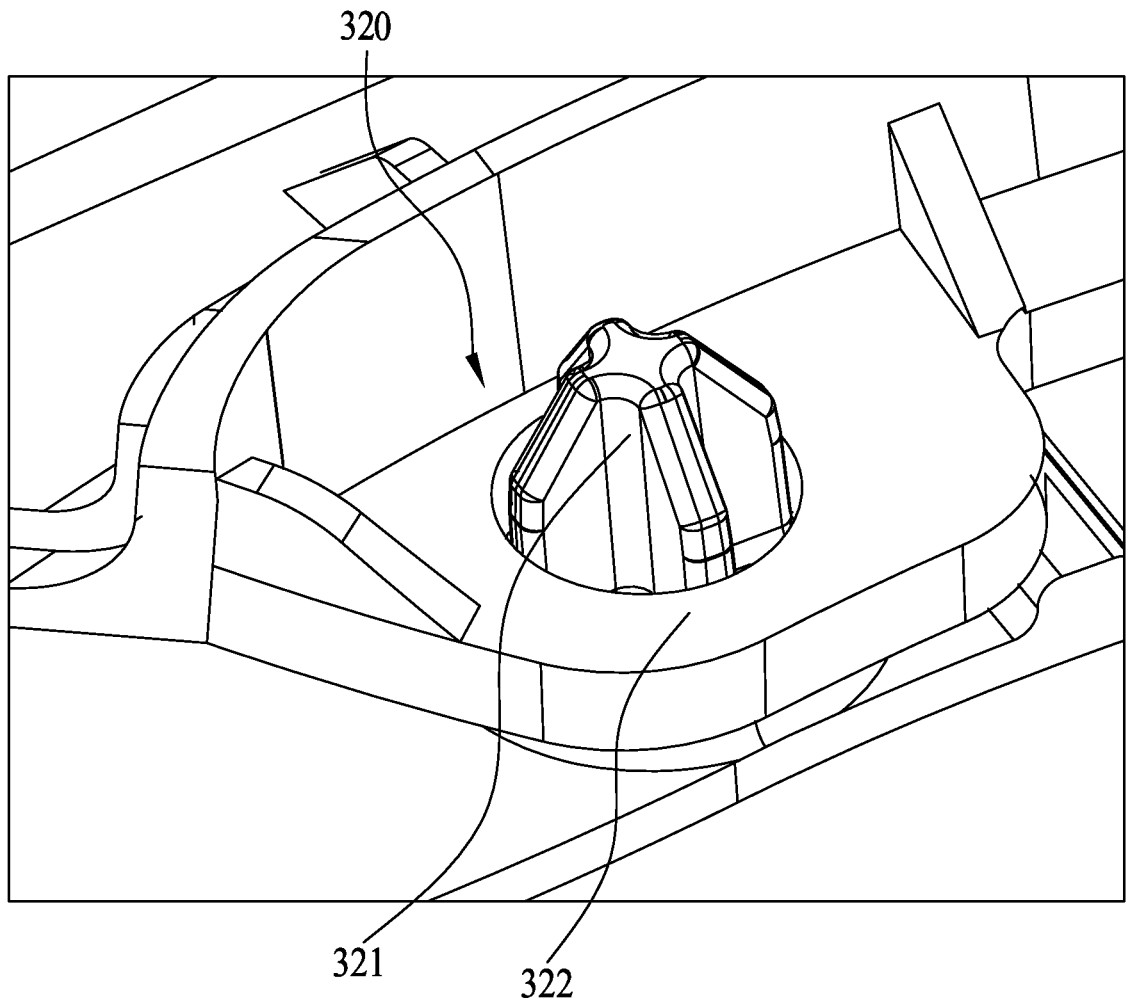
FIG. 3E is an enlarged view of the energy replenishment port assembly of FIGS. 1-3A and 3D taken from region G of FIG. 3A.

FIGS. 3A-3E show an installation structure between the receiving port component 230 and the housing 120 of FIG. 2A. FIG. 3A is a rear view of the energy replenishment port assembly 100 of FIGS. 1, 2A, and 2B with the upper cover 110 removed as shown in FIG. 2B. FIG. 3B is a rear view of a receiving port component 230 and a receiving port component seal 234 of the energy replenishment port assembly 100 of FIGS. 1-3A. FIG. 3C is a rear view of a housing 120 of the energy replenishment port assembly 100 of FIGS. 1-3A. FIG. 3D is an enlarged view of the energy replenishment port assembly 100 of FIGS. 1-3A taken from region F of FIG. 3A. FIG. 3E is an enlarged view of the energy replenishment port assembly 100 of FIGS. 1-3A and 3D taken from region G of FIG. 3A.

As shown in FIG. 3A, five engaging assemblies 310 and two positioning assemblies 320 are provided on the base plate 233 and the housing 120. The engaging assemblies 310 are used for installing the base plate 233 onto the housing 120 by means of engaging connection, and the positioning assemblies 320 are used for positioning the installation position of the base plate 233 relative to the housing 120. It should be understood by those skilled in the art that the number of the engaging assemblies 310 and the positioning assemblies 320 described above is not limited to the number as shown in FIG. 3A, but may be more or less, which is within the scope of protection of the present disclosure.

As shown in FIGS. 3B, 3C, and 3D, each engaging assembly 310 comprises a snap-fit fastener 311 arranged on the reverse side of the base plate 233 and a snap-fit fastener receiving part 312 arranged on the edge of the installation port 222 of the housing 120. The snap-fit fastener 311 extends from the reverse side of the base plate 233 and forms a bent hook part 351. The snap-fit fastener receiving part 312 is a tab that extends inwards from the edge of the installation port 222. The hook part 351 of the snap-fit fastener 311 can be engaged on the snap-fit fastener receiving part 312.

As shown in FIGS. 3B, 3C, and 3E, each positioning assembly 320 comprises a positioning protrusion 321 arranged on the reverse side of the base plate 233 and a positioning hole 322 arranged on the housing 120. The positioning hole 322 is arranged on a tab extending inwards from the edge of the installation port 222, and the position of the positioning hole 322 corresponds to the position of the positioning protrusion 321. During installation, by inserting the positioning protrusions 321 into the positioning holes 322, the position of the base plate 233 relative to the housing 120 can be determined, thereby ensuring that the receiving ports 231, 232 on the receiving port component 230 are aligned with a fuel tank inlet or a charging jacket in the vehicle body. Moreover, by inserting the positioning protrusions 321 into the positioning holes 322, the snap-fit fasteners 311 on the base plate 233 can be accurately engaged on the respective snap-fit fastener receiving parts 312 on the housing 120. As shown in FIG. 3E, the positioning protrusion 321 is substantially cone-shaped to facilitate the insertion of the positioning protrusion 321 into the positioning hole 322. In addition, as shown in FIG. 3A, the two positioning assemblies 320 are respectively arranged on opposite sides of the receiving port component 230 to better position the receiving port component 230.

FIG. 3B also shows the installation structure between the receiving port component seal 234 and the receiving port component 230. As shown in FIG. 3B, the receiving port component seal 234 is provided with lugs 332 projecting inwards, and lug receiving parts 331 corresponding to the lugs 332 is provided on the base plate 233 at positions close to the edge for receiving the lugs 332 to install the receiving port component seal 234 onto the base plate 233. The way of connection between the lug receiving part 331 and the lug 332 can be configured flexibly, for example, the lug receiving part 331 is a protruding part, and the lug 332 is provided with a hole so as to be sheathed on the lug receiving part 331. It should be understood by those skilled in the art that the number and position of the above-mentioned lug 332 and lug receiving part 331 can be flexibly adjusted according to actual needs, for example, one or more lugs 332 and lug receiving parts 331 can be provided.

Figure 4A:
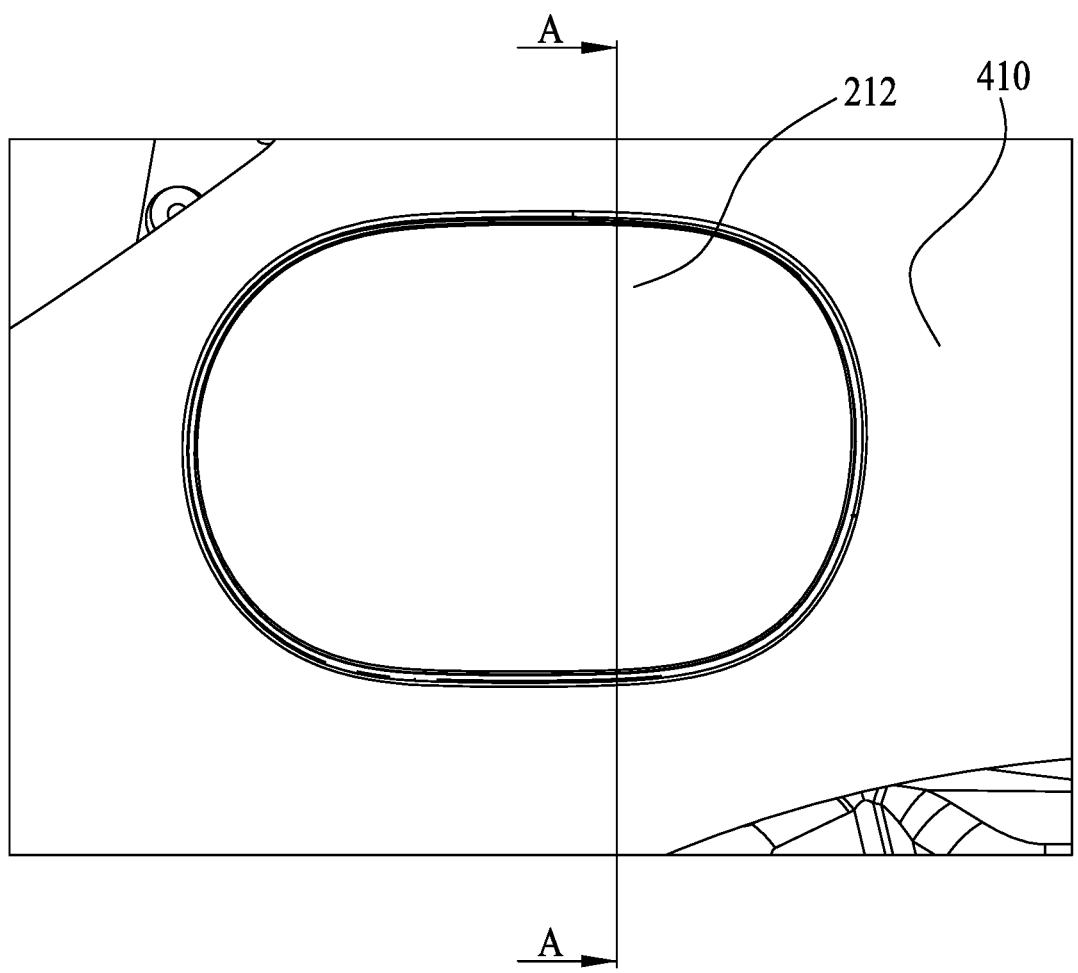
FIG. 4A is a front view of the energy replenishment port assembly of FIGS. 1-3A, 3D, and 3E installed in a vehicle body.
Figure 4B:
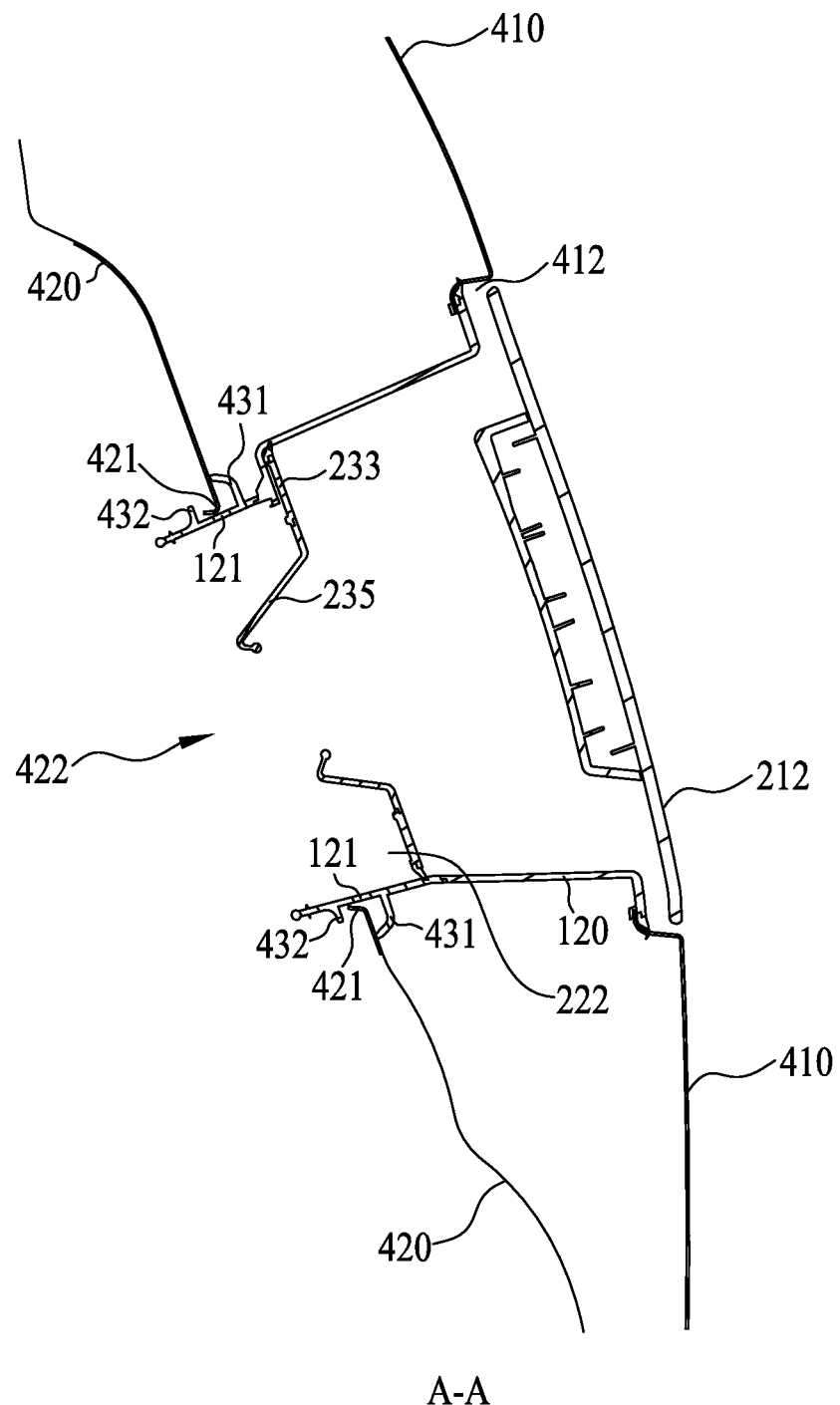
FIG. 4B is a cross-sectional view of the energy replenishment port assembly of FIGS. 1-3A, and 3D-4A installed in the vehicle body taken along a line A-A of FIG. 4A.

FIGS. 4A and 4B are views of the energy replenishment port assembly 100 of FIG. 1 installed on the vehicle body. FIG. 4A shows a front view of the energy replenishment port assembly 100 as viewed from the outside of the vehicle body, and FIG. 4B shows a cross-sectional view taken along a line A-A in FIG. 4A.

As shown in FIGS. 4A and 4B, the vehicle body has an outer metal plate 410 and an inner metal plate 420, and the energy replenishment port assembly 100 is installed in an opening 412 of the outer metal plate 410 and an opening 422 of the inner metal plate 420 of the vehicle body. After closing the upper cover 110, only the cover plate 212 is visible from the outside of the vehicle body, and the cover plate 212 is flush with the outer metal plate 410 of the vehicle body.

As shown in FIG. 4B, the opening 422 on the inner metal plate 420 is aligned with an inlet of a fuel tank (not shown) in the vehicle body. The edge of the opening 422 forms a bent part 421.

As shown in FIG. 4B, the housing seal 121 is sized to match the size of the opening 422 on the inner metal plate 420 such that when the housing seal 121 of the energy replenishment port assembly 100 is pressed into the opening 422 on the inner metal plate 420, the outer side of the housing seal 121 can be pressed against the bent part 421 of the opening 422 on the inner metal plate 420. The outer side of the housing seal 121 is provided with a first protruding part 431 and a second protruding part 432 that extend outwardly. The first protruding part 431 and the second protruding part 432 extend around the outer side of the housing seal 121 and are spaced apart from each other. The length of the first protruding part 431 extending outwardly is greater than the length of the second protruding part 432 extending outwardly, and the second protruding part 432 is configured to pass through the opening 422 on the inner metal plate 420 through deformation of the second protruding part 432, and the first protruding part 431 is configured to be unable (or difficult) to pass through the opening 422 on the inner metal plate 420. When the housing seal 121 is installed in place on the inner metal plate 420, the bent part 421 of the opening 422 on the inner metal plate 420 is received between the first protruding part 431 and the second protruding part 432 so that the energy replenishment port assembly 100 is securely installed on the vehicle body.

Still as shown in FIG. 4B, after the energy replenishment port assembly 100 is installed in place on the vehicle body, the receiving port component 230 covers the installation port 222 of the housing 120, and the pipeline seals 235, 236 extend into the installation port 222 of the housing 120 and into the housing seal 121. Therefore, if viewed from the outside of the vehicle body toward the inside of the vehicle body, the installation port 222 of the housing 120 and the housing seal 121 are shielded and invisible.

Figure 5A:
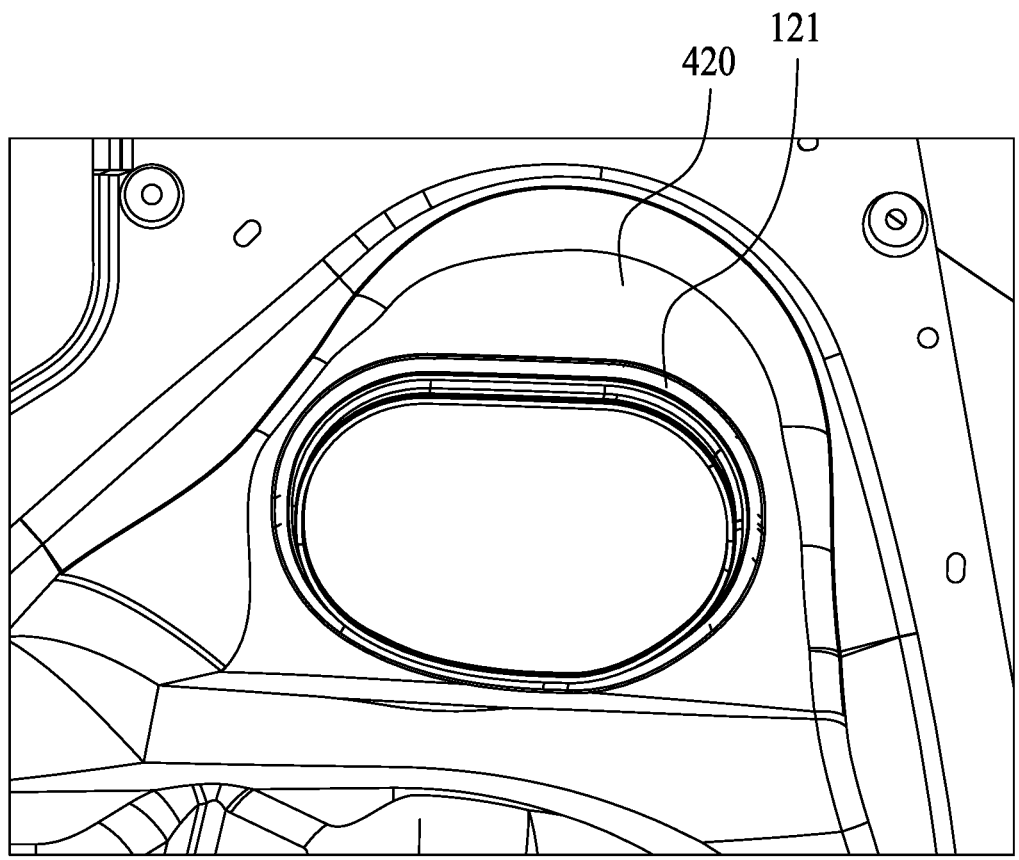
FIG. 5A shows a first step of an installation process for installing the energy replenishment port assembly of FIGS. 1-3A, and 3D-4B into the vehicle body of FIGS. 4A and 4B.
Figure 5B:
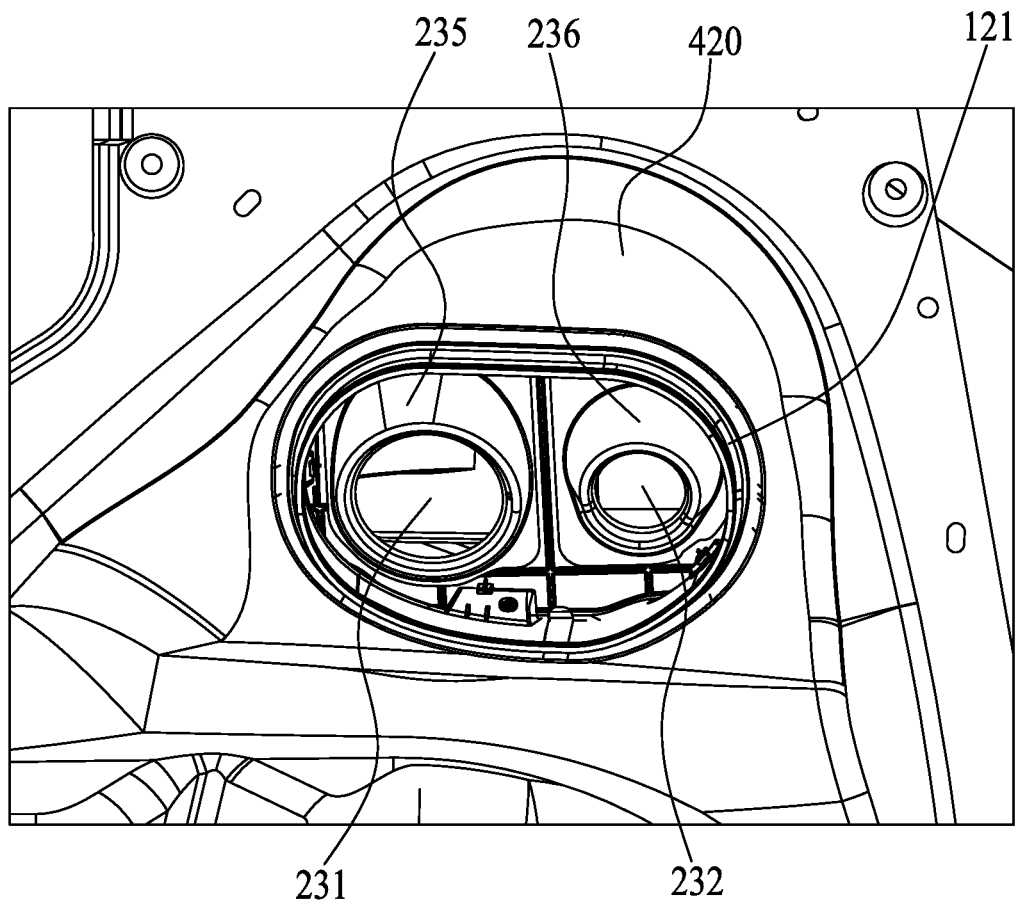
FIG. 5B shows a second step of the installation process of FIG. 5A.

FIG. 5A shows a first step of an installation process for installing the energy replenishment port assembly of FIGS. 1-3A, and 3D-4B into the vehicle body of FIGS. 4A and 4B. FIG. 5B shows a second step of the installation process of FIG. 5A. The installation process of FIGS. 5A and 5B is viewed from an interior of the vehicle body.

As shown in FIGS. 5A and 5B, when the energy replenishment port assembly 100 is being installed on the vehicle body, the housing 120 is first installed, wherein the housing seal 121 on the housing 120 is first pressed into the opening 422 on the inner metal plate 420. In order to install the housing seal 121 in place on the inner metal plate 420, the operator needs to put one hand completely inside the inner metal plate 420 through the installation port 222 on the housing 120 and the housing seal 121, and then grasp a free end of the housing seal 121 with the hand and pull the housing seal 121 inwards toward the interior of the inner metal plate 420 such that the second protruding part 432 on the housing seal 121 passes over the bent part 421 on the inner metal plate 420. Due to the above configuration of the first protruding part 431 and the second protruding part 432, even if the housing seal 121 is continuously pulled inwards toward the interior of the inner metal plate 420, the bent part 421 on the inner metal plate 420 is unable (or difficult) to pass over the first protruding part 431. The bent part 421 on the inner metal plate 420 is thus received between the first protruding part 431 and the second protruding part 432 of the housing seal 121, and the housing seal 121 is installed in place so as to maintain the housing seal 121 to be in good contact and seal with the inner metal plate 420 of the vehicle body. In some cases, the operator may even put both hands into the installation port 222 on the housing 120 to carry out the installation operation described above for the housing seal 121.

As shown in FIG. 5B, after the installation steps as shown in FIG. 5A are completed, the receiving port component 230 is installed onto the installation port 222 of the housing 120 by the engaging assemblies 310 and the positioning assemblies 320.

The upper cover 110 may be installed onto the housing 120 before the installation steps as shown in FIG. 5A or after the installation steps as shown in FIG. 5B.

Thus, the energy replenishment port assembly 100 is installed in place on the vehicle body.

In an energy replenishment port assembly of the prior art, both a housing seal and a pipeline seal are integrally formed with a housing by means of overmolding. The applicant has found that for such an energy replenishment port assembly of the prior art, the installation port of the housing and the housing seal are shielded and invisible if viewed from the outside of the vehicle body toward the inside of the vehicle body, and thus it is impossible to determine whether the housing seal is installed in place viewed from the outside of the vehicle body. Also, because the truncated cone shape formed by the pipeline seal usually has the size matching the size of the energy replenishment connector, the operator cannot put one hand completely inside the inner metal plate through the pipeline seal to carry out the installation operation for the housing seal. Although the operator can insert one or two fingers into the pipeline seal, it is impossible to carry out the installation operation for the housing seal with the inserted fingers. Especially when the housing seal extends farther toward the interior of the vehicle body, the operator even cannot touch the housing seal with the inserted fingers.

According to the energy replenishment port assembly 100 provided by the present disclosure, the receiving port component 230 is detachably installed on the housing 120 such that when the energy replenishment port assembly 100 is being installed, the housing 120 can be installed first, and the receiving port component 230 is then installed after the housing seal 121 is installed in place. Since there is no obstruction from the receiving port component 230, the operator can conveniently adjust the installation fit between the housing seal 121 and the vehicle body. Since the installation port 222 has a large opening, the operator can put one hand completely inside the installation port to directly shape the housing seal 121 from the outside of the vehicle body and can observe whether the housing seal 121 is installed in place by viewing from outside the vehicle body, for example, if there are improper folds on the housing seal 121, it is not installed in place. In addition, the receiving port component 230 can be conveniently and quickly installed onto the housing 120 by the engaging assemblies 310 and the positioning assemblies 320 only by pressing from the outside to the inside. With the energy replenishment port assembly 100 provided by the present disclosure, it is possible to achieve good sealing between the energy replenishment port assembly 100 and inner metal plate 420 of the vehicle body and between the energy replenishment port assembly 100 and the energy replenishment connector while realizing convenient installation.

In addition, it should be noted that although FIG. 4B shows a sealing structure on the outer side of the housing seal 121 of the energy replenishment port assembly 100, the energy replenishment port assembly according to the present disclosure is not limited to the sealing structure as shown in FIG. 4B. For other types of sealing structures on the outer side of the housing seal, the structure for detachably installing the receiving port component onto the housing according to the present disclosure can also be used to achieve good sealing between the energy replenishment port assembly and the inner metal plate of the vehicle body while realizing convenient installation.

This description uses examples to disclose the present disclosure, in which one or more examples are illustrated in the drawings. Each example is provided to explain the present disclosure but is not intended to limit the present disclosure. In fact, it would have been obvious to those skilled in the art that various modifications and variations can be made to the present disclosure without departing from the scope or spirit of the present disclosure. For example, the illustrated or described features as part of one embodiment can be used with another embodiment to provide a further embodiment. Thus, it is intended that the present disclosure cover the modifications and variations made within the scope of the appended claims and their equivalents.

The invention claimed is:

1. An energy replenishment port assembly comprising:
a housing including an installation port;
a housing seal comprised of an elastic material, the housing seal being arranged on an edge of the installation port and extending outwardly from a reverse side of the edge of the installation port; and
a receiving port component including a receiving port, the receiving port component being configured to be detachably installed on the installation port, the receiving port being configured to receive an energy replenishment connector;
wherein the housing seal is configured to sealingly engage an edge of an opening of an inner metal plate of a vehicle body such that a first protruding part and a second protruding part of the housing seal are disposed on opposite sides of the inner metal with the first protruding part sealingly engaging an outer surface of the inner metal plate of the vehicle body.

2. The energy replenishment port assembly of claim 1, wherein the receiving port includes a pipeline seal that is configured to sealingly contact the energy replenishment connector received by the receiving port.

3. The energy replenishment port assembly according to claim 1, wherein the receiving port component further includes a base plate extending outwardly from an edge of the receiving port, and
wherein the receiving port component is configured to be installed on the installation port via the base plate.

4. The energy replenishment port assembly according to claim 3, further comprising a receiving port component seal arranged between the base plate and the housing.

5. The energy replenishment port assembly according to claim 3, wherein the base plate is configured to engage the housing.

6. The energy replenishment port assembly according to claim 5, wherein the base plate further includes a snap-fit fastener arranged on a reverse side of the base plate, and
wherein the housing further includes a snap-fit fastener receiving part arranged at the edge of the installation port and which is configured to receive the snap-fit fastener of the base plate.

7. The energy replenishment port assembly according to claim 3, wherein a positioning assembly is arranged on the base plate and the housing, the positioning assembly being configured to position the base plate relative to the housing.

8. The energy replenishment port assembly according to claim 7, wherein the positioning assembly includes:
a positioning protrusion arranged on a reverse side of the base plate; and
a positioning hole arranged on the housing that is configured to receive the positioning protrusion.

9. The energy replenishment port assembly according to claim 1, further comprising an upper cover pivotably mounted on the housing such that the receiving port is exposed when the upper cover is in an opened position and the receiving port is covered when the upper cover is in a closed position.

10. The energy replenishment port assembly according to claim 1, wherein the receiving port component includes two receiving ports.

11. An energy replenishment port assembly, comprising:
a housing including an installation port and a snap-fit fastener receiving part, the snap-fit fastener receiving part being arranged at an edge of the installation port;
a housing seal comprised of an elastic material, the housing seal being arranged on the edge of the installation port and extending outwardly from a reverse side of the edge of the installation port; and
a receiving port component including:
a receiving port configured to receive an energy replenishment connector; and
a base plate extending outwardly from an edge of the receiving port, the base plate including a snap-fit fastener arranged on a reverse side of the base plate, the snap-fit fastener being configured to be received by the snap-fit fastener receiving part of the housing,
wherein the receiving port component is configured to be detachably installed on the installation port of the housing via the snap-fit fastener of the base plate, and
wherein the housing seal is configured to sealingly engage an edge of an opening of a vehicle body when the housing is inserted into the opening of the vehicle body.

12. The energy replenishment port assembly according to claim 11, wherein the housing seal is integrally formed with the housing.

13. The energy replenishment port assembly according to claim 11, further comprising a receiving port component seal arranged between the base plate and housing.

14. The energy replenishment port assembly according to claim 11, further comprising an upper cover pivotably mounted on the housing.

15. The energy replenishment port assembly according to claim 11, further comprising a positioning assembly arranged on the base plate and the housing, the positioning assembly being configured to position the base plate relative to the housing.

16. The energy replenishment port assembly according to claim 15, wherein the positioning assembly includes:
a positioning protrusion arranged on a reverse side of the base plate; and
a positioning hole arranged on the housing, the positioning hole being configured to receive the positioning protrusion.

17. An energy replenishment port assembly, comprising:
a housing including an installation port;
a housing seal comprised of an elastic material, the housing seal being arranged on an edge of the installation port and extending outwardly from a reverse side of the edge of the installation port; and
a receiving port component including:
a receiving port configured to receive an energy replenishment connector;
a base plate extending outwardly from an edge of the receiving port, the receiving port component being configured to be detachably installed on the installation port of the housing via the base plate; and
a positioning assembly arranged on the base plate and the housing, the positioning assembly including:
a positioning protrusion arranged on a reverse side of the base plate; and
a positioning hole arranged on the housing, the positioning hole being configured to receive the positioning protrusion,
wherein the housing seal is configured to sealingly engage an edge of an opening of a vehicle body when the housing is inserted into the opening of the vehicle body.

18. The energy replenishment port assembly according to claim 17, further comprising a receiving port component seal arranged on an outer edge of the base plate.

19. The energy replenishment port assembly according to claim 18, wherein the receiving port component seal is integrally formed with the base plate.

20. The energy replenishment port assembly according to claim 18, wherein the base plate further includes a snap-fit fastener-arranged on a reverse side of the base plate, and
wherein the housing further includes a snap-fit fastener receiving part arranged at the edge of the installation port and which is configured to receive the snap-fit fastener of the base plate.

* * * * *